United States Patent
Vinson

[15] 3,696,720
[45] Oct. 10, 1972

[54] METHOD AND APPARATUS FOR PHOTOGRAPHING OSCILLOSCOPE TRACES WITH CONVENTIONAL CAMERA

[72] Inventor: Billy H. Vinson, San Diego, Calif.
[73] Assignee: Integrated Controls, Inc.
[22] Filed: Aug. 11, 1971
[21] Appl. No.: 170,723

[52] U.S. Cl. ............95/10 C, 95/64 D, 95/64 R, 250/217, 178/7.82, 346/110, 355/20
[51] Int. Cl. ........H01j 29/06, G02f 1/28, G03b 27/76
[58] Field of Search .....355/20; 95/10 C, 64 R, 64 D; 346/110 R; 250/217 R; 178/7.82

[56] References Cited
UNITED STATES PATENTS
2,842,025   7/1958   Craig......................355/20 X
3,259,008   7/1906   Buck......................178/7.82 X Primary Examiner—Walter Stolwein
Assistant Examiner—T. N. Grigsby
Attorney—Pastoriza & Kelly

[57] ABSTRACT

A hood structure incorporating a close-up lens and a specific light source whose intensity may be varied serves to support a conventional camera in front of an oscilloscope screen for photographing an oscilloscope trace. The hood blocks ambient light from the camera and the specific light source in the hood controls the exposure of the camera such as the shutter speed and/or the f-stop opening by causing this light source to shine on the photocell and by varying its intensity. Since the invention permits the use of a conventional camera, the entire apparatus is extremely economical for photographing oscilloscope traces.

6 Claims, 3 Drawing Figures

PATENTED OCT 10 1972  3,696,720 ic equipment is fairly expensive. Further, such camera arrangements as are available are of the type that require subsequent development of the film in a laboratory so that there is a considerable delay in obtaining the results of a photograph of the traces.

METHOD AND APPARATUS FOR PHOTOGRAPHING OSCILLOSCOPE TRACES WITH CONVENTIONAL CAMERA

This invention relates generally to the photographing of oscilloscope traces and more particularly to a method and apparatus enabling a conventional camera to be utilized without requiring any structural changes in the camera itself.

BACKGROUND OF THE INVENTION

Photographing cathode ray tube displays or any type of oscilloscope trace is a common practice. However, special cameras have had to be provided for this purpose with the result that the photographic equipment is fairly expensive. Further, such camera arrangements as are available are of the type that require subsequent development of the film in a laboratory so that there is a considerable delay in obtaining the results of a photograph of the traces.

BRIEF DESCRIPTION OF THE PRESENT INVENTION

With the foregoing in mind, the present invention provides a method and apparatus for photographing oscilloscope traces which enables a conventional camera to be utilized.

More particularly, the invention provides a hood structure for co-operation with a camera of the type in which the film is developed within the camera so that a resulting picture is available within one or two minutes. For example, such cameras are available under the tradename of POLAROID COLORPACK II. The hood structure itself incorporates a close-up lens and a special light source positioned to co-operate with the normal photocell controlling the exposure of the camera. By adjusting the intensity of this light source, the exposure of the camera, that is, the shutter speed and/or the f-stop opening can be adjusted to provide a properly exposed picture. The dimensioning of the hood and the close-up lens incorporated therein provides an image ratio 1:1.

In a preferred embodiment, the light source in the hood is energized from the battery in the camera normally provided for the flash bulb and a connector on the hood is designed for direct connection to the flash bulb mount of the camera.

With the foregoing arrangement, most conventional cameras can be utilized to effectively take photographs of oscilloscope traces.

BRIEF DESCRIPTION OF THE DRAWINGS

A better understanding of the invention will be had by referring to the accompanying drawings in which.

DETAILED DESCRIPTION OF THE INVENTION

In accord with the method of the invention, a camera is utilized which includes a photo-electric cell for controlling the exposure of the camera.

The steps of the method include supporting of the camera at a given distance in front of the oscilloscope screen, blocking all ambient light from reaching the lens of the camera so that only light from the trace reaches the lens, providing a specific light source juxtaposed to the photocell and blocking all other light from the photocell so that the photocell receives only light from the source, and adjusting the intensity of the light source to thereby control the exposure of the camera to provide a properly exposed picture of the oscilloscope trace.

The method may also include the step of positioning a close-up lens between the camera and oscilloscope screen to provide an image ratio 1:1. In addition, the method may include the step of energizing the light source by connecting it to the flash bulb terminals of the camera to thereby utilize the flash bulb battery normally provided in the camera.

The preferred apparatus for carrying out the foregoing method will now be described in conjunction with the accompanying drawings.

Figure 1:
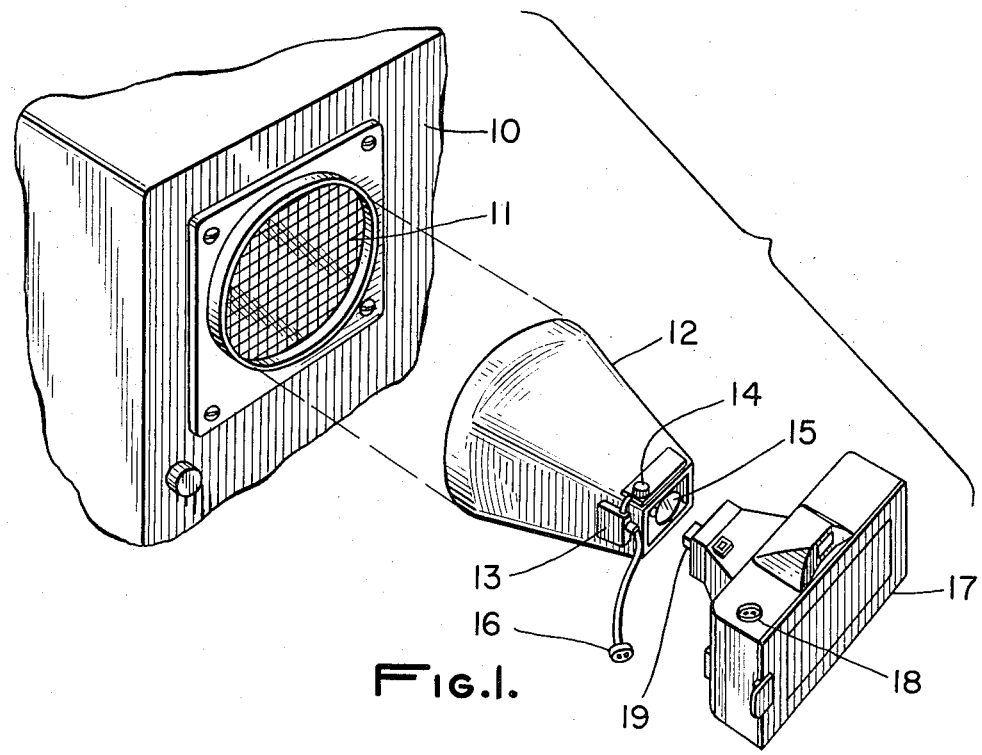
FIG. 1 is a fragmentary exploded view of an oscilloscope, hood structure in accord with the invention, and a conventional camera enabling the photographing of oscilloscope traces.

Referring first to FIG. 1 there is shown an oscilloscope 10 having an oscilloscope screen 11. On this screen there may be a trace or any other cathode ray tube data displayed of which it is desired to take a photograph.

In accord with the invention, there is provided a hood structure 12 including a light source 13, a means 14 for adjusting the intensity of the light source 13, a close-up lens 15, and a connecting means 16.

The foregoing elements co-operate with a conventional camera 17 which is preferably a POLAROID COLORPACK II type wherein a self-developing feature is included so that the photograph may be developed within the camera and is available a few minutes after exposure. These cameras generally include a flash bulb mount 18 as well as a photoelectric cell 19 for controlling exposure. In this case of the particular POLAROID COLORPACK II camera shown, the exposure is controlled by varying the shutter speed by means of the photocell. However, in other cameras the f-stop opening may be automatically controlled by the photocell. The term "camera exposure" as used herein is used mainly to include either a variation of shutter speed and/or variation in f-stop opening to control the exposure.

Figure 2:
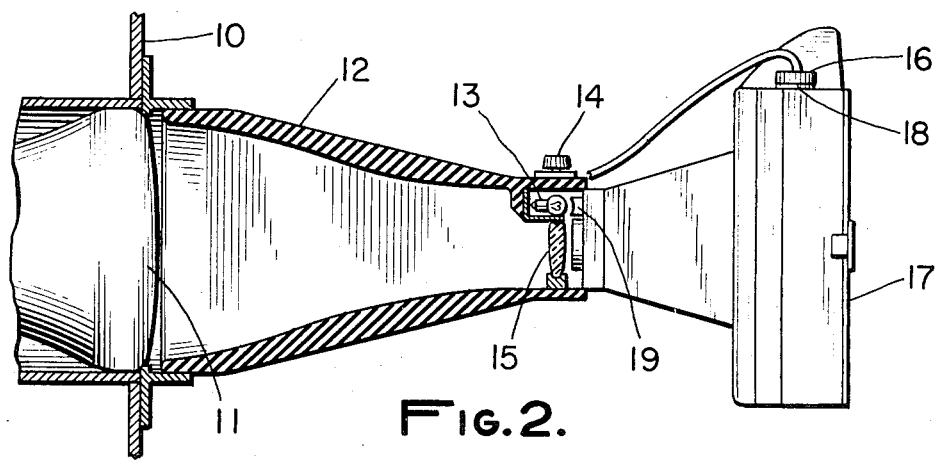
FIG. 2 is a fragmentary view partly in cross-section of the various components of FIG. 1 in assembled relationship preparatory to photographing the oscilloscope screen; and, FIG. 3 is a circuit diagram of certain components within the hood structure and the camera useful in explaining the operation of the invention.

Referring now to FIG. 2, the hood 12 is flexible to the extent that its front portion may be supported either within or without the rim of the oscilloscope screen. In fact, the flexibility is such that the hood can be adapted to rectangular or circular screens of 4, 5 or 6 inches in diagonal measurement.

The front lens portion of the camera 17 in turn fits within the other end of the hood as shown in FIG. 2 and the hood thus supports the camera at a given distance from the oscilloscope screen 11. It will be noted that the close-up lens 15 is contained within the hood 12 between the camera lens and the oscilloscope screen, the arrangement being such that an image ratio 1:1 results.

The specific light source 13 referred to in FIG. 1 is illustrated in the cross-section of FIG. 2 and may constitute a simple flash light bulb held in a position juxtaposed to the photo-electric cell 19 of the camera when the camera is received in the hood 12. The arrangement is such that the photo-electric cell 19 will only receive light from the source 13, all other light being blocked from the photocell. The hood 12 in turn blocks all ambient light from reaching the lens as well as the photocell so that only light from the trace or picture on the screen to be photographed reaches the lens.

In FIG. 2, the connector 16 from the light source is shown connected to the flash bulb socket 18 of the camera 17.

Figure 3:
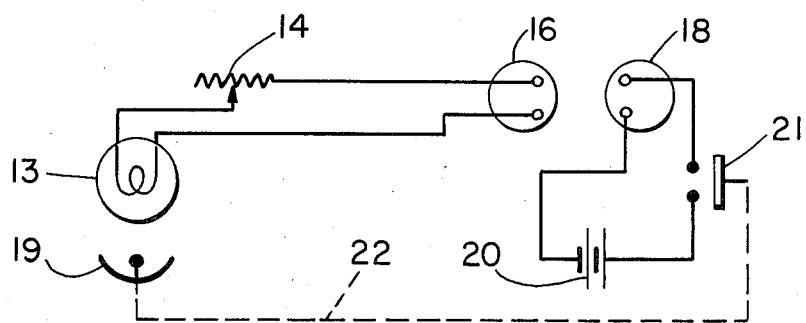

Referring to FIG. 3, the intensity adjusting means 14 takes the form of a variable resistance connected in series with the light source 13. The connector 16 in turn is designed to connect directly to the flash bulb socket 18 of the camera. The normal flash bulb battery incorporated in the camera is schematically indicated at 20 together with the shutter switch 21. The length of time the shutter will remain open is controlled by the photocell 19 as indicated by the dashed line 22.

OPERATION

In operation, the camera shutter plunger is pushed down opening the shutter and supplying power to the flash bulb receptacle of the camera. After mounting the camera itself to the hood and positioning the hood over the oscilloscope screen, connection of the connector 16 to the flash bulb socket or receptacle will apply power from the battery to the variable resistor and light bulb 13 these elements being connected in series as shown in FIG. 3. With the variable resistor at minimum resistance, the light bulb will be brightest and the camera shutter will close after about one-sixtieth of a second. With the variable resistor at maximum, the bulb will be dimmest and the shutter will close after about one-fourth of a second or longer. Resistor settings between these extremes will give shutter opening durations between one-sixtieth and one-fourth of a second.

From the foregoing, it will be appreciated that the exposure of the camera is easily controlled by varying the intensity of the light bulb 13. It will also be appreciated that this control is entirely independent of the light from the trace being photographed.

It is not essential, of course, that the light source be powered from the battery in the camera which is normally provided for the flash bulb. However, by providing the connector 16 advantage can be taken of this available power supply in the camera and thereby decrease the overall cost of the adapting structure in the form of the hood.

By utilizing a polaroid type camera, the resulting picture can be developed and is available a few minutes after exposure. The light intensity varying means 14 may include a calibration scale adjacent to the knob structure portion thereof illustrated in FIGS. 1 and 2 so that once a calibration has been completed, the data may be provided in the form of a reference table showing exposure time as a function of knob setting.

From the foregoing description, it will be evident that the present invention has provided an extremely simple and economical apparatus for enabling a conventional type camera to be utilized in photographing oscilloscope traces. The resulting photographs are excellent in quality and thus provide a recorded picture at far less expense than normally required with equipment available heretofore.

What is claimed is:

1. A method of photographing an oscilloscope trace with a camera in which the exposure is controlled by a photo-electric cell, comprising the steps of:
   a. supporting the camera at a given distance in front of the oscilloscope screen;
   b. blocking all ambient light from reaching the lens of said camera so that only light from said trace reaches said lens;
   c. providing a specific light source juxtaposed to said photocell and blocking all other light from said photocell so that said photocell receives only light from said source; and
   d. adjusting the intensity of said light source to thereby control the exposure of said camera to provide a properly exposed picture of the oscilloscope trace.

2. The method of claim 1, including the step of positioning a close-up lens between said camera and oscilloscope screen to provide an image ratio of 1:1.

3. The method of claim 1, in which said light source is energized by connecting it to the flash bulb terminals of said camera to thereby utilize the flash bulb battery in said camera.

4. An apparatus for photographing an oscilloscope trace with a camera in which the camera exposure is controlled by a photo-electric cell mounted on said camera, comprising, in combination:
   a. a hood for supporting the camera at a given distance from the screen of said oscilloscope and simultaneously blocking all ambient light from reaching the lens of said camera when mounted on said hood and said hood is positioned over said screen so that only light from said trace reaches said lens;
   b. a specific light source on said hood positioned to be juxtaposed to said photoelectric cell of said camera when said camera is mounted on said hood such that said photo-electric cell receives only light from said source and is blocked from receiving light from any other source; and,
   c. means on said hood for adjusting the intensity of said light source whereby the exposure of said camera may be controlled independently of the brightness of said trace to be photographed by varying the intensity of said light source to thereby provide proper exposure of the oscilloscope trace.

5. An apparatus according to claim 4, including a close-up lens mounted in said hood between the oscilloscope screen and camera lens when said camera is mounted on said hood to provide substantially a 1:1 image ratio.

6. An apparatus according to claim 5, in which said means for adjusting the intensity of said light source comprises a variable resistance connected in series with said light source, said resistance and light source connecting to a connector means on said hood adapted to connect to the flash bulb terminals in said camera so that the flash bulb battery in said camera serves as a source of energy for said light source.

* * * * *